United States Patent
Pace et al.

(10) Patent No.: US 7,158,999 B2
(45) Date of Patent: Jan. 2, 2007

(54) REORGANIZATION AND REPAIR OF AN ICF CATALOG WHILE OPEN AND IN-USE IN A DIGITAL DATA STORAGE SYSTEM

(75) Inventors: Richard G. Pace, Simi Valley, CA (US); Martin K. Hasegawa, Seattle, WA (US); Ronald K. Ferguson, Bellevue, WA (US)

(73) Assignee: Mainstar Software Corporation, Bellevue, WA (US)

( * ) Notice: Subject to any disclaimer, the term of this patent is extended or adjusted under 35 U.S.C. 154(b) by 510 days.

(21) Appl. No.: 10/783,835

(22) Filed: Feb. 20, 2004

(65) Prior Publication Data

US 2005/0187990 A1 Aug. 25, 2005

(51) Int. Cl.
*G06F 7/00* (2006.01)
(52) U.S. Cl. ...................... 707/204; 707/202
(58) Field of Classification Search ............... 707/202, 707/204
See application file for complete search history.

(56) References Cited

U.S. PATENT DOCUMENTS 5,222,235 A 6/1993 Hintz et al.
5,649,152 A 7/1997 Ohran et al. ............... 395/441
2003/0135478 A1 7/2003 Marshall et al.

OTHER PUBLICATIONS

International Search Report, PCT/US2005/005414, issued Apr. 27, 2006.
Sockut et al., "Database Reorganization-Principles and Practice" *Computing Surveys*, vol. 11, No. 4, Dec. 1979.

*Primary Examiner*—Hosain Alam
*Assistant Examiner*—Sangwoo Ahn
(74) *Attorney, Agent, or Firm*—Stoel Rives LLP

(57) ABSTRACT

MVS mainframe computer systems employ the ICF (Integrated Catalog Facility) catalog environment to manage numerous data sets. To provide 24×7 availability of those data sets, the BCS (250,270) must be re-organized while leaving the catalog open to access by applications. To perform a re-org while open, a data CI correlation table (500) is constructed (314) and used to lay the data CIs into a backup file in logical order (316), so that they can be loaded into the new BCS (324) without sorting, thereby reducing downtime. Additionally, if the BCS is damaged during normal operation, repair of the structure must also be performed to ensure that correct access is maintained to all data that is cataloged in the BCS. Throughout the re-org process, structural integrity checks are performed on the data and index component of the BCS, and if errors are encountered, they can be repaired.

10 Claims, 7 Drawing Sheets

| CI # | Data Control Intervals |
|---|---|
| 0 | A |
| 1 | Z |
| 2 | B |
| 3 |  |
| 4 | D |
| 5 | Q |
| 6 | R |
| 7 | S |
| 8 | C |
| 9 |  |
| 10 | U |
| 11 | W |

FIGURE 5A

Data CI Table
*500*

| -1 | 2 | 11 | -1 | 0 | 8 | -1 | -1 | 8 | 5 | 4 | 6 | 5 | 7 | 6 | 10 | 2 | 4 | -1 | -1 | 7 | 11 | 10 | 1 |
|---|---|---|---|---|---|---|---|---|---|---|---|---|---|---|---|---|---|---|---|---|---|---|---|
| 0 | | 1 | | 2 | | 3 | | 4 | | 5 | | 6 | | 7 | | 8 | | 9 | | 10 | | 11 | |
| A | | Z | | B | | | | D | | Q | | R | | S | | C | | | | U | | W | |

FIGURE 5B

- *Catalog Index Defects*

REORGANIZATION AND REPAIR OF AN ICF CATALOG WHILE OPEN AND IN-USE IN A DIGITAL DATA STORAGE SYSTEM

COPYRIGHT NOTICE

©2003–2004 Mainstar Software Corporation. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d).

TECHNICAL FIELD

This invention is in the field of digital data storage systems and, more specifically, pertains to storage systems that employ ICF catalogs for managing and using data sets.

BACKGROUND OF THE INVENTION

The IBM MVS® mainframe operating system has evolved into the primary data server for very large enterprise computer system environments. This new and critical function has increased the availability of the MVS mainframe system, and all data stored within it, to essentially a 24×7 or "always available" level.

The ICF (Integrated Catalog Facility) catalog environment is a critical component of MVS, as virtually all data or "data sets" within the system must be cataloged within an ICF catalog; they cannot be located for access unless there is a successful search for the data set through the catalog. If the data is not cataloged, if the necessary catalog is not available, or if the catalog has a structural error that prohibits correct access to the data set's information, the application attempting to locate it cannot gain access. In even the smallest MVS systems, there are often hundreds of thousands of data sets, and in a large MVS system, the number of data sets is in the tens of millions. All of these data sets are catalogued, except for a very few special cases not important here.

An ICF catalog consists of two components, the Basic Catalog Structure (BCS), where the data set's name and disk storage volume location is stored, and the VSAM Volume Data Set (VVDS), where the physical and logical attributes of the data set are stored. Due to MVS system design, most MVS environments, regardless of their size, have a fairly small number of catalogs, typically between 10 and 100. The BCS portion of an ICF catalog can be physically stored on any disk volume, regardless of the location of the data that it catalogs. Each VVDS is physically stored on the volume on which the data resides that it defines, and therefore, the number of VVDSs is typically equal to the number of volumes that an MVS system has assigned to it. Each VVDS comprises a series of VVRs (VSAM Volume Records). The term "BCS" is generally used to describe the physical structure that contains the catalog records; the term "catalog" means the same as BCS, and is used to describe a BCS user catalog in general—for the purposes of this invention description, the two terms will be used interchangeably.

As a simple example, FIG. 1 shows three data storage volumes 110, 112, and 114. A BCS 120 resides on volume Vol. 001 (110), along with a VVDS 124 which, in turn, defines one or more data sets stored on that volume. Here, a record 202 (and one or more associated relationship records) in the BCS 120 points to one or more corresponding records 208 in VVDS 124, as indicated by the dashed line, and these records in the VVDS in turn point to the corresponding components of the VSAM data set 126 ("VSAM") also on volume 110, as indicated by a dashed line as well. (In general, we will use dashed lines in such drawings to indicate references or pointers.) The BCS 120 also includes a second record 204 (and its associated relationship records) that point to a record 216 in a second VVDS 132 on Vol. 002 (112), which in turn defines a data set 134 on volume 112.

As is well known, an MVS system has two types of BCSs—one master catalog that identifies and locates the operating system data sets used by the MVS system, and one or more user catalogs that identify and locate all other data sets that are to be accessible to the system. (BCS 120 is a user catalog.) In order to be usable and accessible on a system, a user catalog must be "connected" to the system via a special record in the master catalog, called a UCAT Connector Record (not shown). Upon first use by the system following IPL (Initial Program Load), a user catalog is opened to the Catalog Address Space (CAS) catalog management program routines, and unless explicitly closed by an operator command, it remains open to the system for the life of the IPL. As further explained below, the important aspects of the present invention are methods of reorganizing and repairing the BCS while it remains open. When data storage devices are shared, that is, concurrently accessible and updateable by multiple operating systems, mechanisms exist to prevent unsynchronized sequences of events from occurring. When the serialization protocols are not adhered to, then the integrity of the physical data can be compromised.

Because an MVS system typically has few user catalogs, but a very large number of cataloged data sets, a single BCS will often have hundreds of thousands, possibly millions of data sets cataloged within it. These data sets are used by online data base systems that remain in use for weeks at a time, or even longer, and the data sets are not closed throughout that time. The same, or other, data sets are also used by "batch" job streams that are usually scheduled for execution on a daily, weekly, or monthly basis.

The catalog is considered "in use" as soon as it is opened by CAS, regardless of any open data sets cataloged within it. As mentioned, the catalog remains open for the life of the IPL, unless explicitly closed. As long as it is in use, repair or cleanup catalog management functions cannot be performed without risking the integrity of the catalog's physical structure.

MVS data set names are comprised of 1 to 44 characters. A period in a name, counted as a character, has special meaning. Periods are used to separate a name into nodes, called qualifiers. Qualifiers serve the purpose of grouping names for visual identification and masking capabilities. Also, the left most (high level) 1 to 4 qualifiers may be used to identify which catalog the "locate" pointers to a data set are to be recorded in. If a specific catalog is desired for a group of data sets, a special entry called an "alias" is created in the "master catalog," causing all data sets whose high level qualifier(s) match the defined alias to be cataloged in the corresponding "user catalog." Subsequent locates for an existing data set will begin by searching the master catalog for an alias match, which in turn directs the locate to the associated user catalog.

Historically on MVS systems, the data set name high-level qualifier derives from a short-form name of an application, such as PARTS for a manufacturing organization, and therefore, every data set in the PARTS application will have a name that begins with PARTS. The number of data sets in this application could number in the thousands, or tens of thousands.

Referring again to FIG. 1, to facilitate the search for a data set (in MVS terminology, this is called the "locate" operation), the data set name is used as a keyed search argument. The BCS 120 is physically a VSAM Key Sequenced Data Set (KSDS), and the key of its records is the data set name. When the catalog record for the data set is located, the volume cell(s) inside the record identify the disk storage (DASD) volume(s) on which the data set resides, for example 110 or 112, and points by relative address to the data set's descriptive record(s) within the VVDS 124, 132 (if the data set is VSAM or nonVSAM SMS managed) or the VTOC 128, 130 (if the data set is nonVSAM nonSMS managed). In the drawing, catalog record 202 in BCS 120 points to volume 001, and specifically to record 208 in the VVDS 124. If the VSAM data set is comprised of multiple components, there will be multiple VVDS records describing its components, and therefore the BCS record will have pointers to each VVDS record. Another data set record 204 points to volume 002 and specifically to record 216 in the VVDS 216, which in turn defines the data set 134. Volume 114 has associated VTOC 140, VVDS 142 and a representative KSDS 144.

FIG. 2 illustrates a BCS' internal structure in greater detail. Because the catalog is physically a VSAM KSDS itself, it is comprised of a data component 250 and an index component 270. The data component 250 conceptually comprises a series of columns 252, each column representing one Control Area or CA. The CAs are numbered from left to right beginning with CA.00. Each CA generally corresponds to a physical cylinder in DASD storage, and typically contains dozens or hundreds of Control Intervals or CIs. Each CI, for example 254, 256, can be thought of as a block of data storage records (a "block" is the unit of data transfer in an I/O operation). The catalog's data records are stored within each CI in ascending data set name key sequence, with each record physically adjacent to the record next to it. For deblocking purposes, the length of each record is identified in a positionally-relative control block field (called an RDF, or Record Descriptor Field) at the right end of the CI (not shown). Within the CI, and to the right of the last stored record in the CI, there may be "free space" 257 bytes, resulting from deletions of previous records contained in the CI, or pre-allocated by the user at time of definition and load.

As mentioned above, the BCS is a standard VSAM KSDS, so all records within it are maintained in logical ascending key sequence. Accordingly, when new data sets are added, the value of the data set name key determines the location within the BCS data component where the records will be inserted. Pre-allocated "free space" can be reserved in a BCS with the FREESPACE keyword on the IDCAMS DEFINE USERCATALOG command, and this space can be utilized to store records within the catalog when a new data set is cataloged. Additionally, free space can be reserved at the end of the catalog by allocating it larger than is required.

Pre-allocated free space can be reserved at either (or both) the CI (Control Interval) or CA (Control Area) level, specified as a percentage, and by standard VSAM design it will be evenly distributed across the entire file when it is initially loaded. This scheme is especially beneficial when record insertions are similarly distributed across the file. For example, in FIG. 2, CI level free space 257 in CA.00 and CA level free space 258 are illustrated. When an existing data set is deleted, its record in the BCS is physically removed, dynamically creating free space within the CI that held the record, and this free space can subsequently be utilized if a new data set of a similar name is cataloged at a later time.

When a record insertion is necessary, and sufficient free space within the CI is not available, VSAM automatically performs a "CI split," moving half of the records in the affected CI to an available free CI within the same CA. If a free CI within that CA is not available, VSAM first performs a CA split, moving half of the CIs from the affected CA to an empty CA (always the first CA beyond the Hi-Used Relative Byte Address (called HURBA) at the catalog's end of file (EOF) location, thereby freeing up a CI that can be used to complete the CI split. The catalog's Hi-Allocated Relative Byte Address (called HARBA) represents the physical end of the allocated area of the catalog. If an empty CA cannot be found between the HURBA and HARBA address, VSAM allocates a new physical secondary extent of the BCS, thereby moving the HARBA address to the end of the new extent, and creating one or more empty CAs that can be used for CA splits. The extent limit count for a BCS is a maximum 123 (119 under certain conditions, but generally limited to 123 extents), and unlike other VSAM data sets, the BCS is restricted to a single volume allocation. If the 123 maximum extent limit is reached, Catalog Management fails the new data set allocation because it cannot successfully store the catalog record for the data set. Subsequent to this, other data sets might still be able to allocate, if the value of their data set name "points" to a location within the BCS where there is sufficient free space.

The index component 270 of the BCS is illustrated in simplified conceptual form in FIG. 2. In the illustration, the first level index or "sequence set" 272 comprises a series of records, e.g. 274, 276 etc., each of which logically corresponds to a respective CA in the data component 250. Index record 274 corresponds to CA.00, index record 276 corresponds to CA.01 and so on. The sequence set index record has an entry for each data CI in the corresponding CA, and each entry includes a compressed copy of the highest data set name key value within that CI, and the associated CI number within the CA (from which VSAM can calculate the actual Relative Byte Address (RBA) of the CI when it is required). Therefore, if each CA has 180 CIs per CA (a typical number for many BCSs), the sequence set for each CA will have 180 entries, each containing a high key and address value, or an indicator that the CI is free. A second level index (if needed) comprises another series of records, e.g. 282, 288, each of which correspond to a plurality of first level index records. In a second level index record, there is an entry for each first level index record associated with that record, including an indication of the highest key value in the corresponding first level index record. A third level index record 290 is shown, and there may be more, as needed, associated in this hierarchical fashion, sometimes called a B-tree index structure. At each index level, horizontal pointers such as 292 form a linked list or chain in key sequential order across that index level, used by VSAM for certain types of record access, as well as to verify index structure integrity.

Generally, the BCS is a relatively stable structure, in that the process of cataloging new data sets and deleting existing data sets balances out. After a few CI and CA splits are completed within a BCS, opening up free space in the volatile areas of the catalog, it generally settles down and doesn't grow very much. In such circumstances, many BCS can survive months or years without attention.

Many MVS systems, though, have one or more catalogs that do not fit this pattern. Some catalogs grow very rapidly in size due to a concentration of new data set allocations in one location within the BCS. When this occurs, close attention must be paid to the catalog to minimize the risk of system or application outage when the catalog "fills," and no further data set. records can be inserted at the necessary location. The most frequent cause of this is a data set naming convention for an application that consists (typically) of a sequence number value within the data set name, resulting in each new added data set name inserted immediately after the previous ones within the BCS. Exacerbating this situation, in many applications such as this, if any data sets are deleted, chances are they are the oldest (lowest numbered) data set names. This results in addition of new records at the end of the current records for that group, and record deletions occurring at the front of that group, with the result that the catalog becomes "emptier and emptier" where the deletions are occurring, and "fuller and fuller" where the insertions are occurring. This is well known as the "creeping key" problem in VSAM KSDS files, and is endemic to application files as well as BCSs.

For any type of VSAM KSDS, whether it's an application file or a BCS, the solution to this problem is a file reorganization (generally called a "re-org"). A file reorganization begins with executing a utility program that reads the file (in this case, the BCS) in logical, record key sequence, to unload all records to a backup copy. The data set is then physically deleted and redefined (thereby making it empty), and the backed up records are then reloaded. The result is a "reorganization" of the data blocks (CIs and CAs) within the data set, and its loaded record area is now in proper proportion to the records contained within it. A re-org, for either an application data set or BCS, can be accomplished by commercially available IBM or other vendor utility programs.

In all cases, the known re-org process requires that all external points of access to the object data set or BCS be "quiesced". In this context, the term "quiesced" means that all other software functions that can physically access the object data set must be temporarily inhibited from doing so, by issuing a "close" process, which formally and officially "disconnects" them from further access to the data set. In the case of the BCS, the accessing program is the MVS Catalog Management functions available from any active system that has physical access to it, as well as other utility programs that might be accessing the BCS itself as a data set (for repair or day-to-day management functions).

In many instances, the BCS resides on a shared DASD volume, thereby allowing Catalog Management on any number of MVS systems to be open to the BCS, updating it with new and deleted data sets, and with applications also open and accessing data sets that are cataloged within the BCS. This sharing across systems complicates the coordination and scheduling necessary to quiescing the BCS. For example, various levels of catalog sharing are known in the art, including: (1) Not Shared; (2) Shared only within a single Sysplex; (3) Shared across multiple Sysplexes; and (4) ECS—Enhanced Catalog Sharing within a Sysplex and utilizing the system's Coupling Facility. The present invention provides catalog integrity across these various levels of catalog sharing.

Aside from the re-org considerations, all KSDS structures (including application data sets, as well as a BCS) are prone to structural failures that typically are not life-threatening to the health of the BCS, but rather, are more often errors within localized aspects that only affect certain types of attempted operations. A frequent structural failure is in the index component (due to its internal complexity), where index key values become corrupted, index record pointers are stored incorrectly, entire index records are missing, index records do not correctly reflect data that is physically stored in the associated data component. These defects are illustrated in FIG. 6. Another frequent structural failure is in the data component, where duplicate keyed records are somehow stored, or records are stored out of key sequence. More serious structural failures also occur in a KSDS structure, but on a less frequent basis, necessitating a recovery from a prior backup.

Oftentimes the repair of an existing BCS, rather than restore or forward recovery from an earlier backup, is the preferred course of action. Many of the error situations (as mentioned above) within a BCS lend themselves to this easier and quicker process, with less downtime to the catalog. If a previous backup is being used for forward recovery and it is relatively old, it might require the processing of very large amounts of SMF data to bring the catalog "forward" from the time of the backup to the current time. In the worst situation, such as a user error, there might not even be a usable backup copy of the catalog, and repair of the existing catalog is the only solution. When performing a "repair" using the existing physical BCS structure, the conventional methodology is to perform a backup of the catalog's records, followed immediately by a deletion and new definition (allocation) of the BCS, and reloading of the catalog's records. This is, in fact, similar to a re-org of the catalog, but requires certain changes in methodology (as explained in detail below) from a basic re-org.

Prior Art BCS Re-org Methodologies

Methodologies for performing a BCS re-org exist. Prior art includes IBM IDCAMS EXPORT/IMPORT, EMC Catalog Solution DUMP/REBUILD, and the Catalog Recovery-Plus™ software product BACKUP/RESTORE facility, commercially available from Mainstar Software Corporation, Bellevue, Wash. (assignee of the present invention). These known methodologies do not satisfy the requirements for a "re-org while open," as they inherently require the BCS to be quiesced and closed throughout the re-org process. They also require the BCS to be physically deleted and re-defined between the backup and restore processes. If an attempt is made to utilize one of these methodologies for re-org while the BCS is open and active, serious damage will almost certainly occur to the internal structure of the BCS, and any of the jobs (including Catalog Management) may ABEND (abort or end abnormally) with unpredictable consequences later.

In a prior art BCS re-org process, the user must schedule a quiesce period during which time the BCS will be inaccessible. To ensure that the BCS is not updated between the time of the backup and restore, the MVS operator MODIFY command, or the like, is issued on all systems sharing access to the catalog, forcing it to close and un-allocate to CAS. At this point, user knowledge of, and strict adherence to procedures, across all systems, must be maintained, as the BCS can automatically re-open if any job is executed that requests access to it.

When the user is satisfied that the BCS is quiesced, a system backup utility program is executed, to write a copy of the catalog's data records to a physical sequential file. If EXPORT is used, the records are retrieved in ascending key sequence, as standard VSAM sequential read-access through the BCSs index is utilized. This methodology preserves the catalog's record sequence for restoring into the newly-defined and empty BCS. If any of the non-IBM system backup utilities are used, the records are retrieved in physical record sequence, bypassing the BCSs index structure.

This latter methodology protects against existing index structure damage that the BCS might have (see FIG. 6), ensuring that all records from the BCS data component are retrieved, but it requires that the records be sorted prior to restoring them into the newly-defined and empty BCS.

When the backup is complete, the existing BCS is deleted, re-defined as a new, empty BCS, and the records from the backup file are then restored with the appropriate utility function with regard to the backup. In some of the prior art methodologies, the delete/define function is automatically performed for the user, while in others the user must do it manually. Also, some prior art methodologies allow certain physical attributes of the BCS to be changed on the new allocation from the existing BCSs attributes. Regardless of the methodology, when the restore operation is complete, system and application processing that might use the catalog can be restarted, and the catalog will re-open as necessary.

Prior Art BCS Repair Methodologies

Methodologies for performing a BCS repair also exist. Prior art includes EMC Catalog Solution DUMP/REBUILD, and the Catalog RecoveryPlus software product with its BACKUP/RESTORE facility mentioned above. The IBM IDCAMS EXPORT/IMPORT facility is not considered pertinent to BCS repair, as its read logic uses the catalog index structure to perform a logical record access, and index structural errors, as well as duplicate or out-of-sequence record keys cause it to prematurely terminate.

The current methodologies from EMC and Mainstar do not satisfy the requirements for a re-org or repair while open, as they inherently require the BCS to be quiesced and closed throughout the repair process. They also require the BCS to be physically deleted and re-defined between the backup and restore processes. If an attempt is made to utilize one of these methodologies for repair while the BCS is open and active, serious damage will almost certainly occur to the internal structure of the BCS, and any of the jobs (including Catalog Management) may ABEND (abort or end abnormally) with unpredictable results at a subsequent time.

For the BCS, it is very difficult to schedule and perform a re-org or repair operation. In some repair situations, a structural error might affect processing only when executing certain functions, or there might be workarounds that aren't affected by the error. Most BCS have 24×7 availability requirements, from at least one of the MVS systems that are sharing access to it, and the "down-time" to re-org or repair the BCS is disruptive to production application processing. "Down-time" is defined as the time between closing and re-opening of the catalog, enabling application jobs and online systems to once again resume access to the data sets cataloged within the BCS. During down-time, access to the BCS must be stopped, including allocation of new data sets, deletion of existing data sets, and application access to data within existing data sets is denied. Even if the downtime is planned and scheduled, it represents an outage that might not be acceptable for 24×7 environments. If it is unplanned and a forced situation, it can result in disastrous business disruption. For this reason, many BCSs are re-orged very infrequently, and repairs for structural failures might be delayed indefinitely. What is needed is a way to re-org or repair a BCS while keeping it open so that catalogued data sets remain continuously available to applications for processing.

SUMMARY OF THE INVENTION

Two important aspects of the invention are the ability to re-org, and in the event of structural errors, to also perform certain repair functions against a BCS while it is open and accessible to Catalog Management on any number of MVS operating systems that are sharing access to it. In doing so, the invention ensures that any Catalog Management control block information that might require alteration is properly updated as a result of the BCS structural changes that take place during the re-org or repair.

A primary objective of a BCS re-org or repair while open process is minimizing Catalog Management down-time (i.e., the necessary window of its unavailability) which in turn results in minimum impact on application jobs that require use of the catalog, while still complying with the various constraints and requirements mentioned above.

Another primary feature of a BCS re-org or repair while open process in accordance with the present invention is the ability to bypass the requirement to delete and redefine the physical data and index components of the catalog. In one presently preferred embodiment of the invention, this is accomplished by clearing out (as necessary) the internal contents of the existing data and index components, as well as updating the descriptive VVR records in the VVDS, to make the components "appear" as if they were freshly defined. Once that is done, the re-org or repair while open process can perform a reload of the BCSs records "in place," using standard VSAM I/O requests to write the interim backup records into the data component, and in doing so, construct a new set of index records within the index component. It must then "trick" the Catalog Management logic within the Catalog Address Space to refresh its control blocks and buffers, and thereby, correctly address and access the BCSs records in their newly reloaded status.

Another objective is to properly re-organize or repair a BCS while open, allowing continued access to data sets listed in the catalog during the re-org or repair process. A further object is to ensure that the re-org or repair results in a valid, usable BCS when the process is complete. As part of the process, the invention allows the user to alter the CI and CA FREESPACE percentages that will be used by VSAM during the record reload process, and it will allow the deletion of unused physical disk extents at the conclusion of record reload.

One especially important objective of the invention is to enable recovering from a failed re-org or repair attempt without catalog data loss or corruption.

In accordance with the present invention, the BCS can be open and accessible to any number of MVS systems across the time required for the re-org or repair process to complete. The invention logic suspends all Catalog Management (and other program) access to the BCS during the re-org or repair process, ensuring that content and structural changes from the normal course of processing do not occur within the catalog while the re-org or repair is in progress. At the same time, though, application program access to already open data sets from within the BCS is uninterrupted, and unless/until the application programs reach a point in their execution where they require access to the catalog (for example, closing one of the currently-open data sets, allocating additional extents of currently-open data sets, or opening additional data sets from within the program), they will continue to run without any knowledge or concern that access to the BCS has been temporarily suspended.

If a re-org while open is performed, the invention provides a "safety net" in the event a structural error is encountered inside the BCS during the re-org process, by allowing the user to request an optional record-level backup of the catalog be taken at the same time as the re-org backup.

This backup can subsequently be restored if the re-org process signals an error from which it cannot recover.

One example of a method for re-org'ing or repairing a BCS while open in an MVS operating system ICF catalog environment, in accordance with a presently preferred embodiment of the invention, generally comprises the steps of:

a) obtaining the necessary catalog environment information, including addresses of critical system control blocks, the Catalog Address Space ID, and the batch job name under which the re-org is executing;

b) initializing process control blocks for managing the re-org process, and allocating the BCS to be reorganized;

c) opening the BCS and obtaining exclusive control of it in a stabilized or synchronous state;

d) creating an internal, CI-image backup copy of the BCSs records that will be used for the re-org or repair process. This backup copy comprises the CIs for the index component appearing first, followed by CIs for the data component, where either group may or may not be in logical order (depending on types of errors found), but in most cases, the index group will be in physical order and the data component CIs in logical order up to a point where an error is detected, after which "orphaned" data CIs will likely be in relative RBA order;

e) if requested by the user, create an optional record-level emergency recovery backup copy, that is saved beyond the execution of the re-org or repair while open process, and in a format that can later be used to recover the catalog if the re-org or repair process fails;

f) for a re-org or repair while open process, the methodology determines the structural status of the index structure as it is creating the internal backup copy of the BCS. If the index is found to be structurally valid, it can then be safely used to obtain all records in ascending key sequence (this will obviate the need to sort the records into ascending key sequence prior to reload);

g) as the index level 1 ("sequence set") records (of the BCS index component) are processed, construct a logical data CI table that enables the BCSs data records to be accessed and retrieved in logical key sequence;

h) retrieve the records from the data component of the BCS, and format them into physical sequential data blocks and write them to the internal backup file. If the analysis of the index determines there are "orphaned" data CIs (data CIs that contain catalog records, for which there is no controlling index record), they are appended to the internal backup copy;

i) once the internal backup is complete, analyze its records to verify that reload will be successful;

j) rewrite the index and data component control intervals within the physical index and data component of the BCS itself, to indicate they are empty. For the index component, each CI is cleared in its entirety to binary zeroes. For the data component, the CI on each CA boundary is cleared in its entirety to binary zeroes, and all other CIs within the CA have their CIDF field values set to indicate an empty CI. The BCS control blocks are updated to indicate the BCS is empty.

k) Throughout the internal backup process, any correctable that has been identified will be corrected if the repair option was selected by the user, otherwise, recover the catalog to its pre-reorg condition;

l) if a FREESPACE change is requested by the user, alter the VSAM attribute control blocks that govern the CI and CA free space percentage values; at reload of the BCSs records from the internal backup file, the new percentage values will be used;

m) the internal backup are now ready for reload; if they are found to be out of sequence through any errors detected during the backup process, they must first be sorted into ascending key sequence by making a standard call to the system sort routine; after sort is complete, standard VSAM I/O write requests are used to write the backup records into the BCSs data component, and in the process, VSAM constructs a new KSDS index; VSAM processing updates the BCSs DSB and ARD control blocks in storage to reflect the current status of the BCS at the end of the reload process;

n) if "release of unused extents" was requested by the user, alter the BCSs extent description control blocks to remove any physical disk extents that are indicated unused after the record reload operation is complete; update the VTOC and VVDS to reflect the change in extents, physically releasing the space occupied by the unused extents;

o) call the Catalog Management VVDS Manager to read the BCSs VVRs from the VVDS, update the VVRs with the control block information, and then call the VVDS Manager to re-write the VVRs to the VVDS;

p) close the BCS to re-synchronize it with Catalog Management within the Catalog Address Space on the system where the BCS re-org is running. If the BCS is shared, the re-synchronization occurs for every system sharing the BCS—not just the system on which re-org or repair is running; and finally, q) release the exclusive RESERVE on the BCS, allowing all other requesting tasks to regain access and use of the catalog.

Not all of the foregoing steps are essential to doing the re-org or repair per se; some steps provide validity checking, while others create a means to "undo" an attempted re-org or repair that does not complete correctly, so that no catalog data is lost. The re-org or repair steps summarized above are described in greater detail below.

Additional aspects, features and advantages of this invention will be apparent from the following detailed description of preferred embodiments, which proceeds with reference to the accompanying drawings.

BRIEF DESCRIPTION OF THE DRAWINGS

FIG. 5A is a conceptual illustration of a series of data Control Intervals that comprise a Control Area.

FIG. 5B is a conceptual illustration of a Data CI Table in accordance with the present invention.

DETAILED DESCRIPTION OF PREFERRED EMBODIMENTS

Figure 3A:
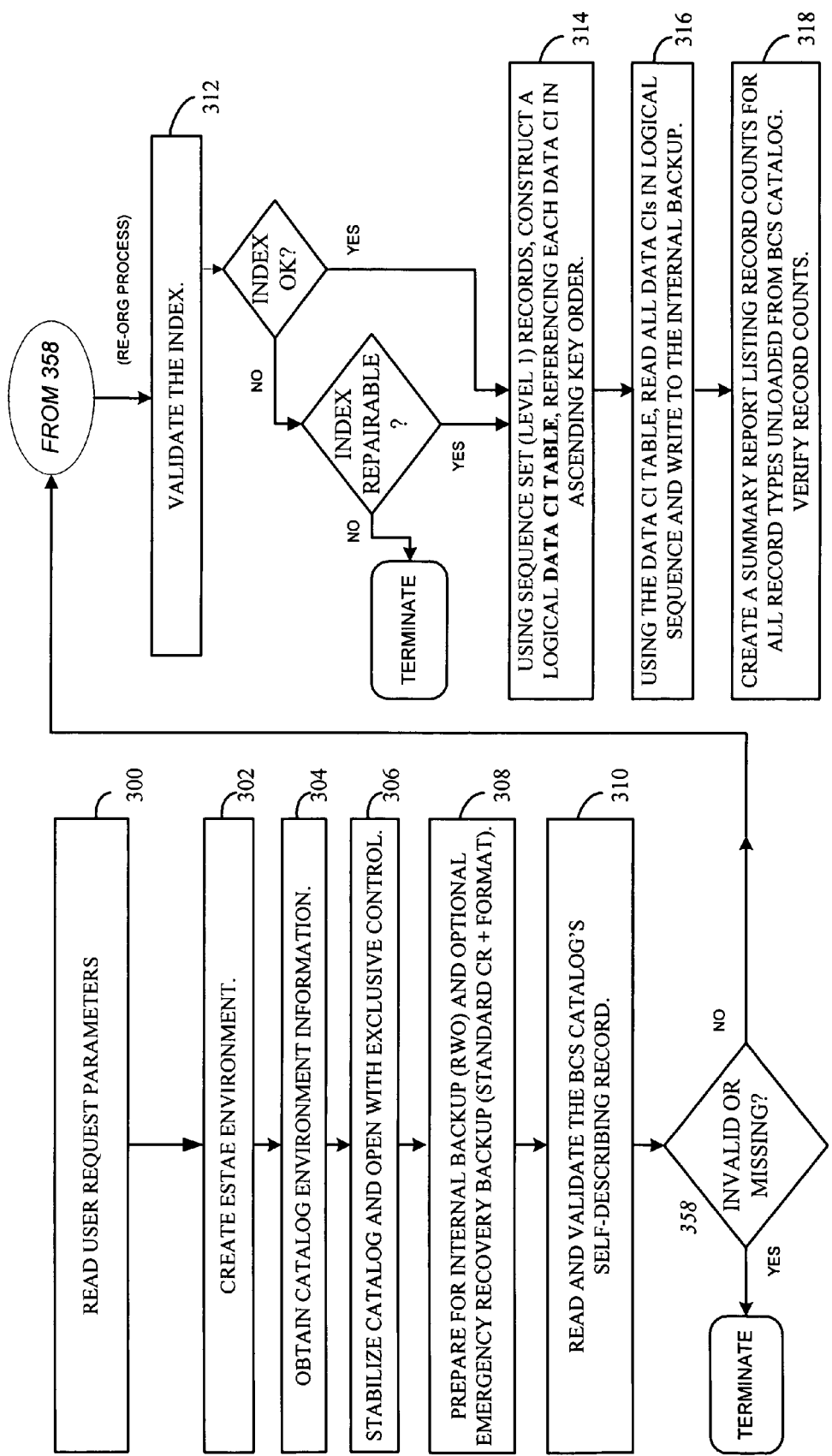
FIGS. 3A–3B together form a process flow diagram depicting a method of BCS re-org or repair while open in accordance with the present invention.

Referring now to FIG. 3, the first step 302 of a presently preferred embodiment establishes the ESTAE environment, so that any ABENDs that might occur during processing will be trapped and handled within the logic. Step 304 obtains catalog environment information, validating that the named catalog is appropriate, and establishing the environment in which the process will execute. In a presently preferred embodiment, much of this information will be the result of specifications or parameters on the user command that initiates the process (see 300). Some options are:

The name of the single BCS to be re-org'ed or repaired. The implementation will require that the BCS to be re-orged or repaired must be currently connected to the master catalog as a user catalog. It cannot be the master catalog of the MVS operating system on which the process is run, although it can be a master catalog of another system if it is not currently an active master catalog at the time of the process.

The catalog is not required to already be open to Catalog Management at the time the re-org or repair process is run, although the user will be required to explicitly state that the process is permitted to execute if the catalog is open.

If the user is already aware that the catalog has structural errors that are to be corrected, a keyword to indicate this will be specified, thereby explicitly stating that the path of the repair logic is to be followed.

The solution will allow the user to optionally request an emergency backup, in a format that can be used in a later recovery if the re-org process is terminated after any point of no return (in addition to the internal backup that is used just for the re-org or repair process).

A simulation of the re-org or repair process can be requested. This step will create the switches within the logic for all processes to be accomplished, without performing the actual internal re-org or repair of the catalog. This mode may result in a certain level of system contention, as a shared RESERVE on the SYSIGGV2 resource name will cause update requests against the BCS to be delayed until the re-org or repair process is complete. This is a requirement in order for the simulation mode to be of any use and value.

Next, step 306 opens the BCS to be re-org'ed or repaired, ensures it is in a stabilized state, and obtains exclusive control of it. To accomplish this, one solution performs the following:

Issue an MVS store clock instruction or otherwise obtain a current timestamp.

Check open flags to determine if the catalog is already open on the system. If it is, ensure that the user specified re-org or repair is to take place on an already-open BCS. If not specified, the process is terminated.

Read the data and index component VVR records of the BCS itself, and obtain the latest BCS refresh timestamp.

Open the catalog with a standard VSAM OPEN macro.

Issue a RESERVE macro for the SYSIGGV2 resources name, for exclusive control if it is an actual re-org or repair process, or shared control if in simulate mode. SYSIGGV2 is the standard resource name used by tasks within the Catalog Address Space for serialization of all BCS accesses. Under exclusive control, all read and update requests from other address spaces, including other systems, will stack up behind this RESERVE. Under shared control, only update requests will stack up.

Obtain the VVRs for the data and index component of the BCS from the VVDS on the volume where the BCS resides (either two or three VVRs are obtained—one each for the data and index component, and one for the index sequence set if the catalog was defined with the IMBED attribute).

Compare the BCS refresh timestamp recorded just prior to the OPEN against the latest BCS refresh timestamp in the BCS's data component VVR. If the latest BCS refresh timestamp is greater, that indicates an update to the catalog during our OPEN process, and the OPEN step is performed again. This loop continues until the latest BCS refresh timestamp is equal or less than the one obtained prior to the OPEN process. This process may be repeated up to 10 times, at which point the re-org or repair is aborted. (10 is an arbitrary number used to prevent an endless loop).

From information within the BCS's VVR records, the solution can determine the extent locations for all physical DASD extents for both components, the CI size for both components, and the data component's maximum allowable logical record length.

Step 308 prepares for the internal backup to be taken, that will subsequently be used to reload the BCS. To the extent possible, the data CIs will be in logical key sequence order. If the re-org process has detected any errors, it is likely that the data CIs will not be in logical order, in which case, a flag switch will be set to indicate that a record sort is required prior to the record reload operation (see 323). (If requested, an optional emergency recovery backup of the BCS's records will be taken at this time, in a format that is suitable for a subsequent recovery of the BCS following termination of the re-org while open process.)

Taking the internal backup, in accordance with one embodiment of the invention, involves the following detailed steps: First, calculate buffer requirements for reading the index and data component of the BCS, then allocate storage for the buffers. Next, allocate the internal backup data set. To do this, the size of the BCS's data and index components are computed from the respective HURBA divided by CI size. This is then converted into number of DASD tracks, and used for the space allocation quantity of the internal backup data set. The backup data set is then dynamically allocated and opened. Other techniques can be used for the internal backup, including without limitation using a dataspace rather than a DASD file. Various methods of taking the internal backup should be deemed equivalent, regardless of the DASD file or dataspace approach.

Preferably, to ensure best possible backup processing performance, all program and storage areas are page-fixed (in groups of 100, to avoid excessive spin loops), and the address space is set non-swappable.

Step 310 calls for reading the BCS's self-describing record (always the first physical record within the catalog), and checking it for existence and validity. If the record is missing, or cannot be validated, test 358, the process is terminated, on the basis that neither the re-org or repair can be successful.

Figure 1:
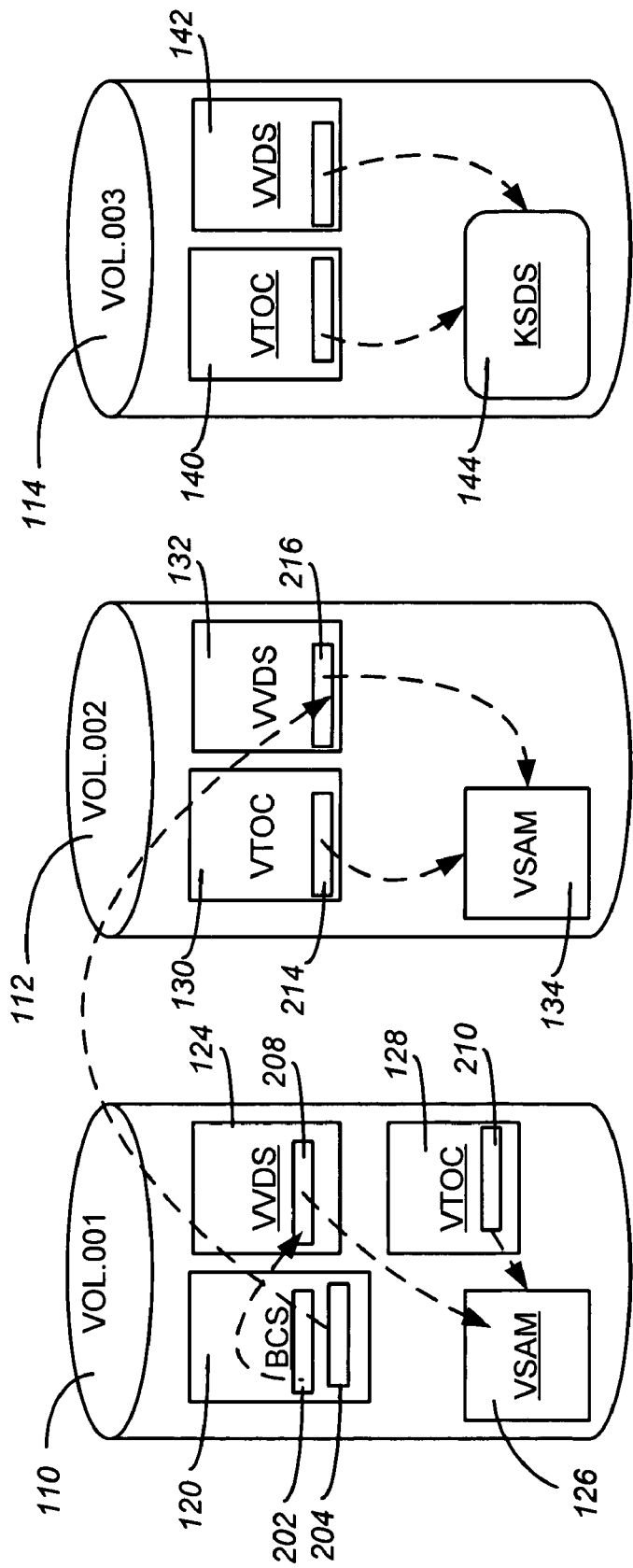
FIG. 1 is a conceptual diagram illustrating MVS data storage volumes, including a BCS and associated VVDS, VTOC and VSAM structures.
Figure 2:
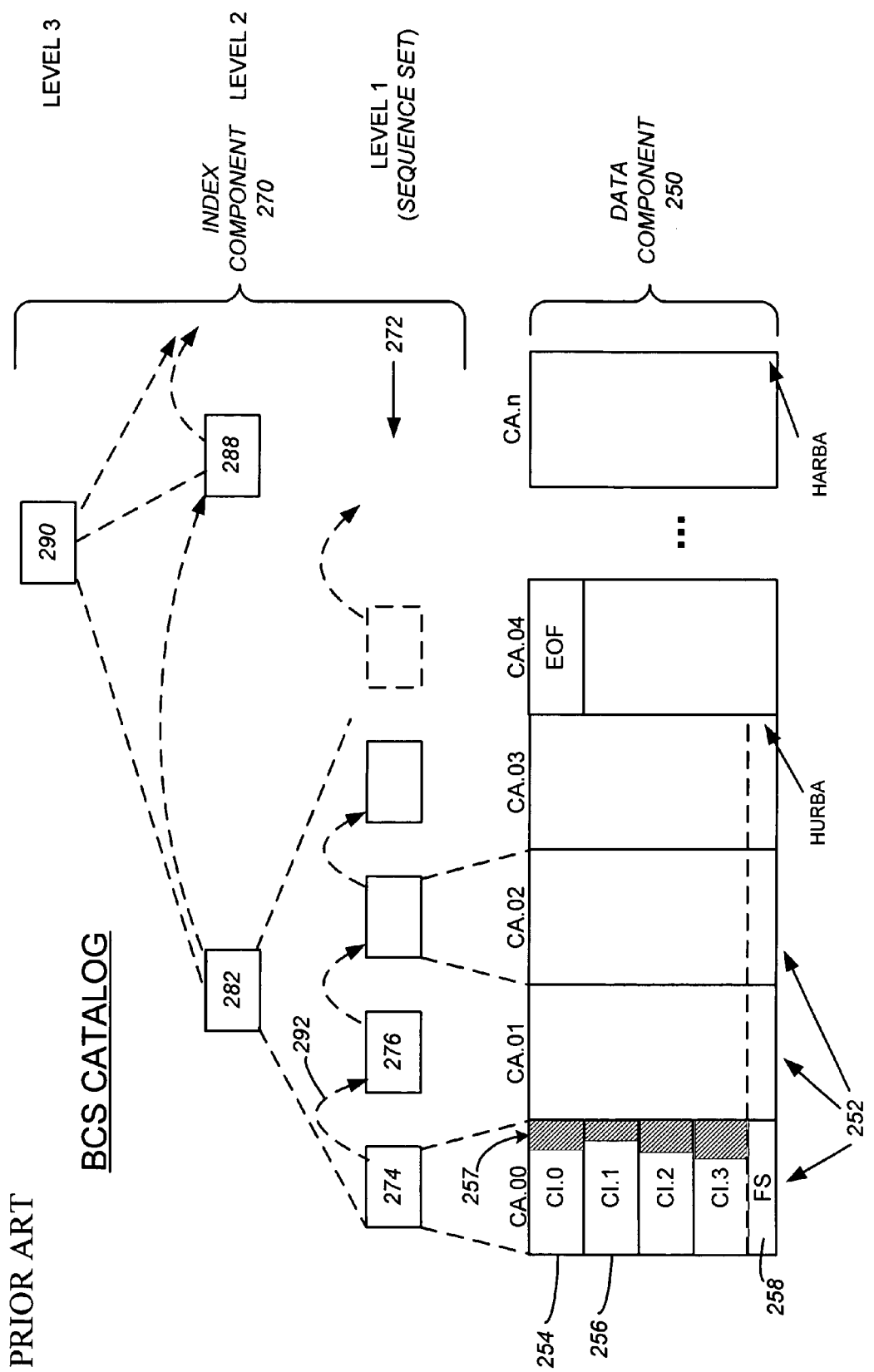
FIG. 2 is a simplified, conceptual diagram of the internal structure of a BCS, depicting the data and index components.

Referring again to FIG. 3A, in Step 312, the BCS's index structure is validated. First, the entire index is read in physical record sequence, all the way to the index EOF, ensuring that any orphaned index records are detected and read as the validation logic proceeds. The validation begins at the highest level index record. From it, the vertical pointer to the first record at the level below is used to retrieve that record, and then process across that level to check the horizontal chain pointers, at the same time as all vertical pointers from the level above are checked. When that level is complete, the same logic is applied to the next level below, and so on, until the Sequence Set level (272 in FIG. 2) is reached. Comparison between the total number of records processed is made against the computed size of the index. All vertical and horizontal pointers in the index are checked to the extent that they fall within the boundaries of the High Allocated RBA (HARBA) of the index. The consistency of used and free data CIs, as represented in the index structure, are checked, and any errors found are noted.

Referring again to FIG. 3B, in step 314, during Sequence Set level processing, a Data CI Table is constructed, encoding the logical sequence of all data component CIs within the BCS. Such a table is illustrated in FIG. 5B, reflecting the data CIs of FIG. 5A, as follows. Referring to FIG. 5A, the letter inside each control interval indicates the starting character of the key for the records contained in the corresponding control interval. For example, CI 2 contains all records that have keys beginning with the letter "B". Notice CI 3 and 9 are empty. Referring now to the Data CI Table of FIG. 5B, the data CI table has one entry for each Data Control Interval. The Data CI table entry number corresponds to the Data CI number (CI #).

The numbers and letters appearing below each entry adjacent the table 500 are for reference purposes and do not constitute any data within the entry. An entry in the Data CI Table consists of a backward and forward pointer. The pointer value is the Data CI number. The backward pointer is the left side of the entry (left of the dash line) and the forward pointer is the right side of the entry. A minus 1 (−1) pointer value means "no pointer value"—i.e. end of the line either forward or backward. An empty, or perhaps "orphaned," Data CI is represented in the table as having −1 in both forward and backward pointers—i.e. it is an unconnected CI. If one were to read the Data CIs in sequential order and extract the records, we would have records with keys starting with "A" followed by records with keys starting with "Z" followed by records with keys starting with "B," and so on. Note that after reading the CI with "B" keys, we would read an empty CI, a wasted I/O operation.

The Data CI Table allows us to read the data CIs in "key sequence". The first index sequence set record (not shown here, but obtained when reading the index records) tells us that the first Data CI (i.e. the data CI with the lowest keyed records) is CI 0. We read Data CI 0, extracting the records. Next we use "0" value to index into the Data CI Table to retrieve the CI 0 table entry. CI 0 table entry has a backward pointer of −1 and a forward pointer of 2. In this process, we are only interested in forward pointers. The value 2 tells us that the next Data CI we need to read is Data CI 2. Data CI 2 contains records with keys starting with "B". After reading Data CI 2, we use the value "2" to index into the Data CI table to retrieve the table entry for CI 2. The table entry for CI 2 contains a backward pointer of 0 and a forward pointer of 8. So the next Data CI to read is CI 8. CI 8 contains records with keys starting with "C". Next, the value "8" is used to index into the CI table to retrieve the CI table entry for CI 8. This table entry has a forward pointer of 4. The reading process continues in this fashion until we finally read CI 1. Now the table entry for CI 1 has a forward pointer of −1. −1 indicates that there are no more Data CIs to read.

If re-org while open processing determines that orphaned data CIs exist (orphaned Data CIs are data CIs which are not controlled by any known index record, or are controlled by an orphaned index record that is not in the sequence set chain), these are read and appended to the internal backup. The corresponding CI entries in the data CI table are linked at the end of the chain. This will likely result in the requirement to perform a sort of the deblocked BCS records during the reload phase (if the "repair" option was specified by the user).

Returning now to FIG. 3A, step 316, the data CI table (500 in FIG. 5B, for example) is used to retrieve each data CI within the data component in ascending key sequence. The CI is written to the internal backup (which may comprise a DASD file or dataspace). (If a Catalog RecoveryPlus BACKUP-format was also requested, the unloaded BCS records are also written to this emergency backup file). In Step 318, a backup summary report is created, showing a record count for all record types that were encountered during the BCS unload.

If spanned records are encountered within the BCS data component, the currently preferred embodiment will either use heuristic techniques to determine how to "piece together" the various segments of the spanned record, or it will use the Sequence Set record for the CA currently being processed, and with the index entry information, the other segments of the spanned record can be identified and attached together.

Figure 3B:
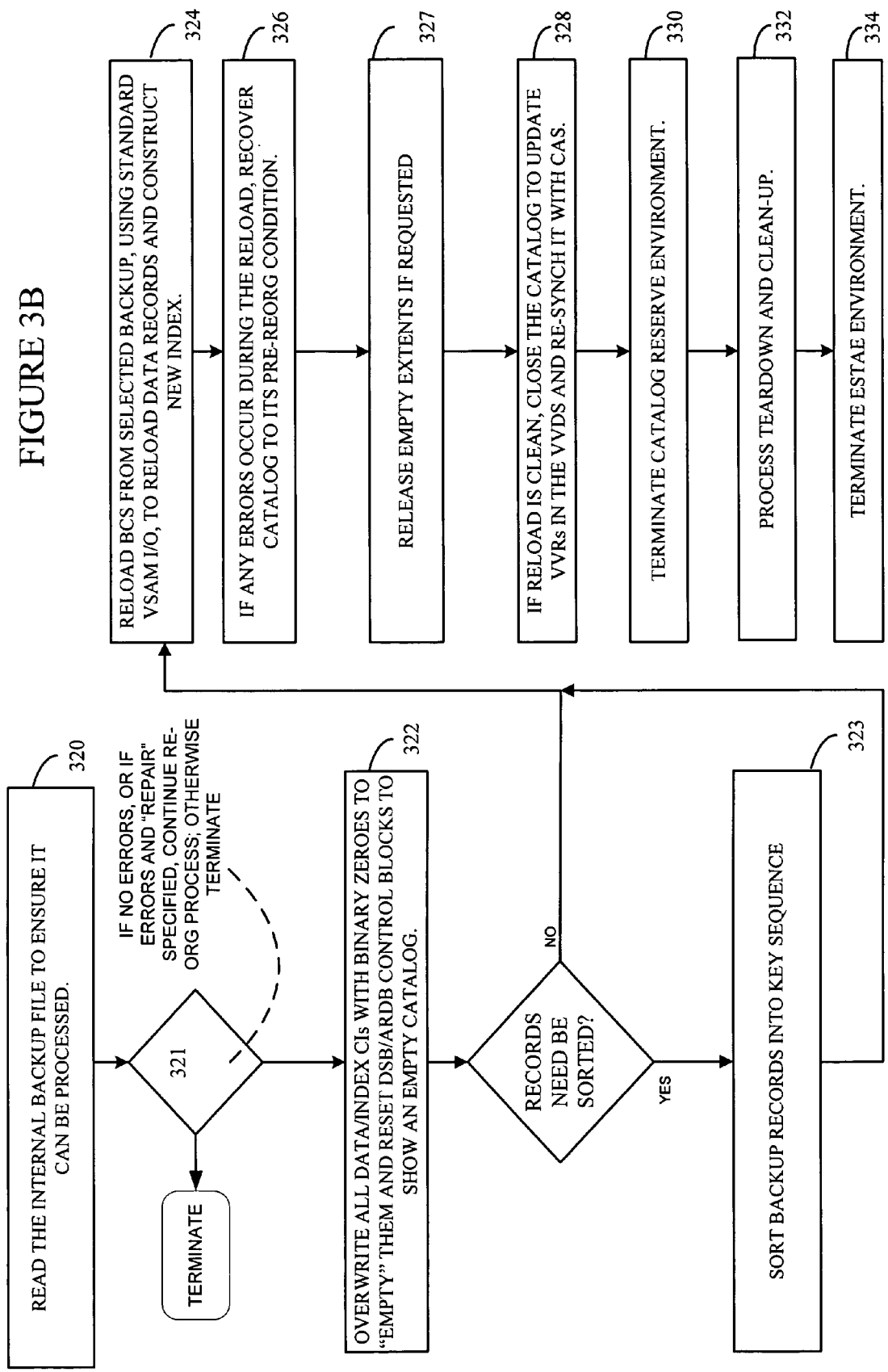

Turning now to FIG. 3B, step 320, the internal backup is read or otherwise verified, to ensure that it can be successfully used to reload the BCS. A verify summary report can be created and printed. The record counts between the internal backup summary and verify summary are compared, and if not equal, the process is terminated. This marks the "point of no return" in that if errors occur from this point forward, the re-org/repair process must be terminated, and the BCS must subsequently be recovered from another backup (see 308).

Decision 321 is made in the logic. If no errors are found, or if errors were found and "repair" was specified by the user, continue the re-org while open process. Otherwise, terminate.

Step 322 begins the actual re-org and repair process of the BCS, and represents the fail-safe point of no-return. This step sets up the environment for the existing BCS data and index structure to be reloaded with its records from the internal backup. The following steps are done:

If the BCS is open on the system where the re-org/repair process is running, there will be a CAXWA entry for this BCS. Set BCS refresh indicators in the CAXWA. Since the presently preferred embodiment code still holds the RESERVE on the SYSIGGV2 resource name, this will take place immediately after the re-org or repair is complete.

The data CI on a CA boundary is written with a CIDF of binary zeros, to indicate a software EOF in VSAM. All other data CIs are written with a CIDF whose values are set to indicate an empty CI—i.e. the low order halfword of the CIDF is set with the full free space CI value. Due to the way VSAM update I/O works, each index CI must first be read for update, then re-written. For the data component, they can be written without a prior read.

At end of processing, all buffers associated with any data and index component ACB are invalidated, and a check of all buffers is made to ensure they have all been physically written out to the BCS. Specifically, buffers that have I/O complete (BUFCEPT in BUFCFLG1 on) (BUFCMW in BUFCIOFL off) will be invalidated. Thus the current process traverses the buffer chain looking for buffers with BUFCEPT on and BUFCMW off. If one is found, it is invalidated by turning off the BUFCVAL in BUFCFLG1. All asynchronous I/O to the BCS is now complete, or if not, there is an error condition somewhere in this process.

Several AMDSB and ARDB control block fields are now zeroed out, for both the index and data component, making them appear empty (i.e., to appear as if they are newly defined and at the "initial load" state for VSAM). This includes the following fields:

The high-level index record pointer—this address points by RBA to the highest level index record. When zero (along with a zero HURBA value), it indicates there are no index records. For an empty BCS with IMBED, the high-level index pointer and the first sequence set pointer may be non-zero. So the "empty" criteria is more specifically when the sequence-set pointer and the HURBA are equal. For an non-IMBED index component, the value is zero; for IMBED index component it is the RBA value of the first sequence set (which is usually non-zero for IMBED).

The high-key RBA and high-used RBA—for VSAM, these are the effective end-of-file address pointer, and when zero they indicate an empty component.

The VVRs for the BCS are updated using the VVDS manager to reflect an empty BCS. More specifically, in some embodiments, the following fields within the VVRs may be updated:

The DSI ICF refresh timestamp of the data component VVR is incremented to indicate refresh is required.

The HURBA in the data set information cell of the index component VVR is set to zero (or if IMBED is specified for the BCS, it is set to the RBA of the first Sequence Set record), which indicate an empty index component.

The VVR DSB is updated to reflect an empty BCS.

The sharing subcell (used for ISC and CDSC catalogs) of the Data DSB VVR is updated with the corresponding INDEX component values for HURBA, HARBA, high-level RBA, and number of index levels. If IMBED, sequence set HURBA and HARBA values are updated. The update count is incremented by the number of slot entries+1 (this forces ISC and CDSC cache flush in CAS). And finally, the shared event table is cleared.

The volume type 23 cell is updated with high key, high used and high allocated RBA values.

If FREESPACE changes were requested by the user parameters, the CI and CA percentage values are updated in the DSB control block for the BCS, so that the reload process will use the requested values when writing the records from the internal backup.

Step 324 reloads the BCS from the internal backup, with the following detailed steps:

First, if a sort is indicated by logic switches, the records obtained from the internal backup are sorted, step 323, prior to starting the reload phase.

The empty BCS is reloaded using standard VSAM I/O from data records obtained from the internal backup.

As the reload proceeds, the key of each record is checked, to ensure all records are in proper ascending key sequence. A check is made to ensure that multiple records with duplicate keys are not encountered, and if they are, records that are duplicate in their entirety are discarded. Duplicate key records that are not duplicate in their entirety are further analyzed to determine which one is most likely to be the correct one, and if satisfactorily determined, it is then written out to the BCS; the other(s) are written to a record anomaly file.

If it is determined that the BCS has one or more completely empty DASD extents, and the user has requested the "release extents" option, the empty extents of the BCS will be freed in step 327. To accomplish this, the following steps can be used:

Close the local ACB for the BCS.

Acquire concurrent exclusive reserves to the VTOC and the VVDS on the volume containing the BCS.

Re-read the VVR's for the BCS components using the EXCP access method.

Remove the unused extent entries from the volume type 23 cell and adjust the HARBA and extent-count values.

Refresh the HARBA and timestamp values in the VVR type 21 cell for the BCS data component.

Update the Format-1 and/or Format-3 DSCBs for the BCS data component in the VTOC.

If the volume has a VTOC Index, use CVAF with VRF update protocols, update the VPSM freespace bitmaps, and if one or more Format-3 DSCB's are deleted, the VMDS DSCB bitmap as well.

If the volume does not have a VTOC Index, (i.e. only has an OS VTOC), then reflect the new free space on the volume by managing the Format-5 or Format-7 DSCB chain through CVAF.

Rewrite the modified VVR for the BCS data component using the EXCP access method.

DEQ the exclusive reserves to the VTOC and VVDS.

When EOF is reached on the internal backup file, the BCS is closed using a standard VSAM CLOSE macro.

R&D testing of one embodiment determined that certain VVR fields may not be automatically updated, so prior to the official CLOSE of the catalog in Step 13, the RBA values in the INDEX and Data component VVRs that were previously reset are now updated with new values obtained from the VSAM controls blocks for the BCS—specifically the DSB and ARDB control blocks for both the INDEX and DATA component." The important fields that CLOSE does not update are the DSI cell creation timestamp and the "25-cell" in the data component. The update of the DSI creation timestamp is crucial to this process.

A re-load summary message is created and written, to provide to the user a visual comparison between the number of BCS records before and after the re-org or repair.

Step 326 is performed if any BCS re-load errors are encountered, with this logic. The highest return code from the attempted re-load is saved and formatted into a message that will hopefully alert the user to the source of the problem. If no errors are detected, the next step 328 closes the BCS.

The Recovery Process

If errors are encountered, an attempt is made to recover the BCS to its pre-REORG state, step 326 in FIG. 3B. This is done by first "emptying" the BCS using VSAM Control Interval access; the index component CIs are rewritten with binary zeros; the data component CIs are rewritten with binary zeros for CIs on a CA boundary and with a CIDF field set to a full free space CI value for CIs not on a CA boundary.

Next, using VSAM Control Interval access and the full CI images from the internal backup, the BCS is rewritten exactly as it was prior to the beginning of the re-org process. Finally, the original VVR records are rewritten back to the VVDS. If this RECOVERY attempt fails, an informative message is issued and the BCS must be recovered external to the re-org. If an optional Catalog RecoveryPlus emergency backup file was created during the re-org process, this can be used.

If executing in SIMULATE mode, or if the re-org or repair process has terminated prior to the load process because of an error condition, a standard VSAM CLOSE is issued, writing the VVRs for the catalog to the VVDS and re-synchronizing CAS as a result of the VVR update.

Step 330 unallocates the BCS and terminates the catalog RESERVE environment. A DEQ macro for the SYSIGGV2 resource name is issued, unblocking access to the newly re-org'ed or repaired BCS from the current system, and all other MVS systems that have shared access to it.

Step 332 is a process teardown and clean-up phase, resulting in all storage areas and table areas being freed. The program and dynamic storage areas are page freed, and all other open data sets from the process are closed.

Step 334 terminates the ESTAE environment, concluding the process.

Figure 4:
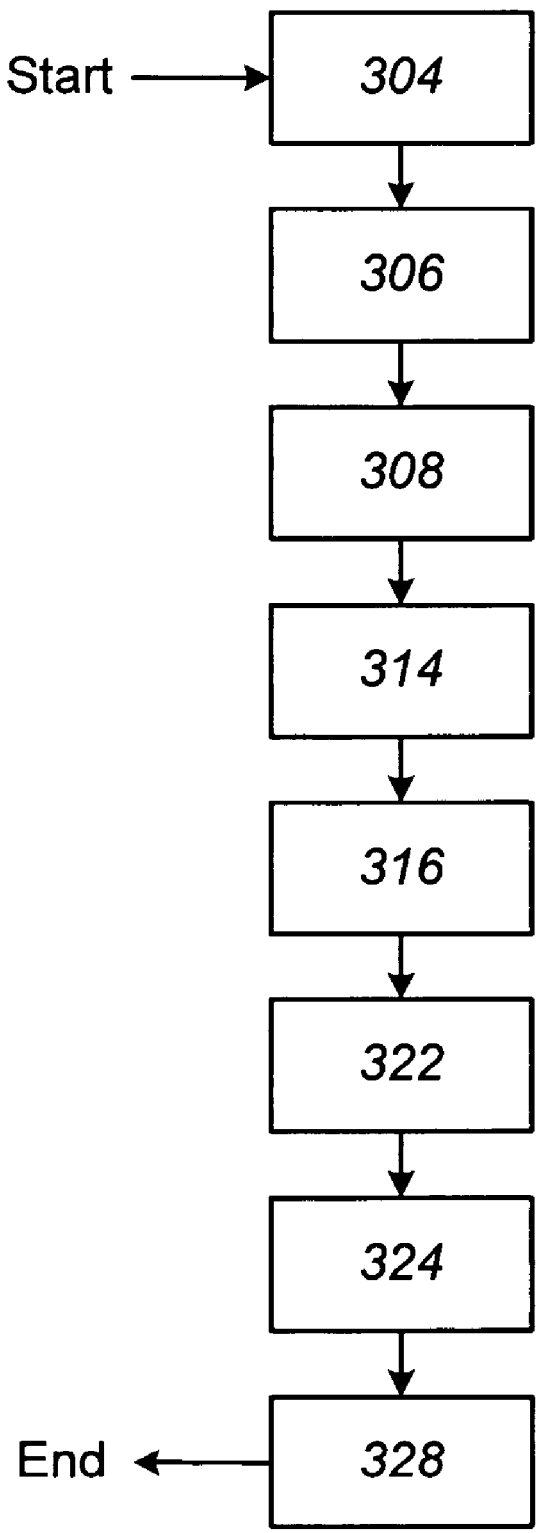
FIG. 4 is a flow diagram depicting an alternative method of BCS re-org or repair while open in accordance with the present invention.
Figure 6:
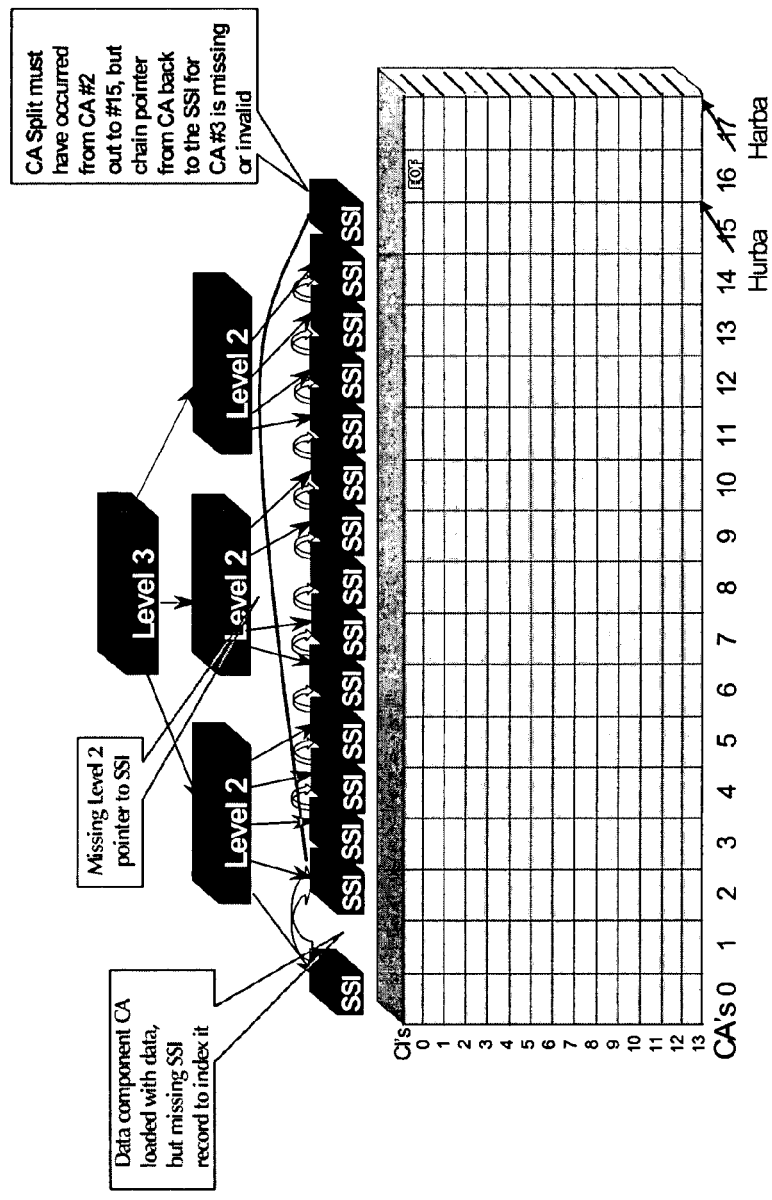
FIG. 6 illustrates common defects in a catalog index component.

FIG. 4 is a flow diagram of an alternative embodiment of the invention; one that includes only the most essential steps. This diagram indicates the reference numbers of corresponding steps from FIG. 3; the respective explanations of those steps above apply; they need not be repeated here.

The invention claimed is:

1. A computer-implemented method of reorganizing an ICF catalog comprising a key sequential data set (KSDS) BCS in a VSAM system while the catalog is open, the BCS comprising a data component and an index component, the reorganization method comprising the steps of:
   (a) opening the catalog with exclusive control;
   (b) creating a backup of the index component;
   (c) using a number of sequence set records of the index component, constructing a logical CI correlation table, the table indicating, for each data CI in the data set, a physical location of the CI in the data component and a logical location of the CI in key sequence order;
   (d) using the logical CI correlation table, reading data CIs from the data component out to an internal backup data set in potential logical key sequence order so as to form an ordered backup of the data without sorting;
   (e) clearing all data CIs in the data component and clearing the index component;
   (f) updating BCS VSAM control blocks so as to reflect an empty BCS;
   (g) reloading the data set from the ordered backup, sorting records if necessary, and using standard VSAM I/O to reload the data records and reconstruct the index; and
   (h) closing the catalog to update VVRs in a VVDS and re-sync the catalog with CAS.

2. The computer-implemented method according to claim 1 wherein the logical CI correlation table is constructed in random access storage.

3. The computer-implemented method according to claim 1 wherein the reloading step includes applying the original free space attributes of the BCS.

4. The computer-implemented method according to claim 1 and further comprising creating an ESTAE environment prior to said creating a backup of the index component, and terminating the ESTAE environment after said reloading step.

5. The computer-implemented method according to claim 1 and further comprising checking for errors during the reloading step and, if an error is detected, recovering the catalog to its pre-reorganization state.

6. The computer-implemented method according to claim 5 and wherein said recovering step comprises copying index and data CIs from the internal backup into the BCS physical locations indicated in the internal backup, thereby restoring the index and data component to the pre-reorganization state.

7. A method of stabilizing an ICF catalog in a VSAM system preparatory to re-organizing the catalog, the method comprising the steps of:
   (a) issuing an instruction to obtain a first timestamp;
   (b) reading a number of BCS VVR records to obtain the latest BCS refresh timestamp;
   (c) opening the BCS with a standard VSAM OPEN macro;
   (d) issuing a RESERVE macro for a SYSIGGV2 resource name, to obtain exclusive control of the catalog;
   (e) obtaining VVRs for the data and index components of the BCS from a VVDS on a volume where the BCS resides;
   (f) comparing the first timestamp to the latest BCS refresh timestamp stored in the BCS's data component VVR; and
   (g) if the latest BCS refresh timestamp is greater, repeating the foregoing steps (a) through (f), inclusive, until the latest BCS refresh timestamp is equal or less than the timestamp obtained prior to the latest iteration of the step (c) opening process.

8. The computer-implemented method according to claim 1 and further comprising an initial step of stabilizing the catalog.

9. The computer-implemented method according to claim 8 wherein stabilizing the catalog comprises the steps of:
   (a) issuing an instruction to obtain a first timestamp;
   (b) reading a number of BCS WR records to obtain the latest BCS refresh timestamp;
   (c) opening the BCS with a standard VSAM OPEN macro;
   (d) obtaining VVRs for the data and index components of the BCS from a VVDS on a volume where the BCS resides;
   (e) comparing the first timestamp to the latest BCS refresh timestamp stored in the BCS's data component VVR; and
   (f) if the latest BCS refresh timestamp is greater, repeating the foregoing steps (a) through (e), inclusive, until the latest BCS refresh timestamp is equal or less than the timestamp obtained prior to the latest iteration of the step (c) opening process.

10. The computer-implemented method according to claim 1 wherein opening the catalog with exclusive control comprises issuing a RESERVE macro for a SYSIGGV2 resource name.

* * * * *

UNITED STATES PATENT AND TRADEMARK OFFICE
CERTIFICATE OF CORRECTION

PATENT NO. : 7,158,999 B2
APPLICATION NO. : 10/783835
DATED : January 2, 2007
INVENTOR(S) : Richard G. Pace, Martin K. Hasegawa and Ronald K. Ferguson It is certified that error appears in the above-identified patent and that said Letters Patent is hereby corrected as shown below:

In Column 3, Line 26, replace "BCS'" with --BCS--.

In Column 3, Line 44, replace "257" with --257--.

In Column 4, Line 21, replace "123 (119" with --123 (119--.

In Column 4, Line 22, replace "123" with --123--.

In Column 4, Line 47, replace "correspond" with --corresponds--.

In Column 4, Line 64, replace "BCS" with --BCSs--.

In Column 5, Line 5, replace "set." with --set--.

In Column 6, Line 3, before "index", insert --or--.

In Column 6, Line 63, replace "BCSs" with --BCS--.

In Column 6, Line 67, replace "BCSs" with --BCS--.

In Column 7, Line 14, replace "BCSs" with --BCS--.

In Column 7, Line 43, replace "BCS" with --BCSs--.

In Column 7, Line 51, replace "sets," with --sets or --.

In Column 8, Line 24, replace "BCSs" with --BCS--.

In Column 8, Line 31, replace "BCSs" with --BCS--.

In Column 9, Line 19, replace "BCSs" with --BCS--.

In Column 9, Line 41, replace "1" with --1--.

In Column 9, Line 43, replace "BCSs" with --BCS--.

In Column 10, Line 3, replace "BCSs" with --BCS--.

In Column 10, Line 12, replace "BCSs" with --BCS--.

In Column 10, Line 14, replace "BCSs" with --BCS--.

UNITED STATES PATENT AND TRADEMARK OFFICE
CERTIFICATE OF CORRECTION

PATENT NO. : 7,158,999 B2
APPLICATION NO. : 10/783835
DATED : January 2, 2007
INVENTOR(S) : Richard G. Pace, Martin K. Hasegawa and Ronald K. Ferguson It is certified that error appears in the above-identified patent and that said Letters Patent is hereby corrected as shown below:

In Column 10, Line 17, replace "BCSs" with --BCS--.

In Column 10, Line 23, replace "BCSs" with --BCS--.

In Column 11, Line 59, replace "resources" with --resource--.

In Column 12, Line 13, after "equal ", insert --to --.

In Column 12, Line 57, replace "or " with --nor --.

In Column 14, Line 61, after "on)", insert --and NOT waiting to be written--.

In Column 15, Line 29, replace "indicate" with --indicates--.

In Column 16, Line 35, delete """.

In Column 18, Line 29, after "equal ", insert --to --.

In Column 18, Line 38, replace "WR" with --VVR--.

In Column 18, Line 50, after "equal ", insert --to --.

Signed and Sealed this

Twentieth Day of March, 2007

JON W. DUDAS
*Director of the United States Patent and Trademark Office*